April 6, 1965 J. A. ENGLERT ETAL 3,176,956
FABRICATED CONDUIT TYPE PIPE LINE VALVES
Filed Dec. 1, 1961 3 Sheets-Sheet 3
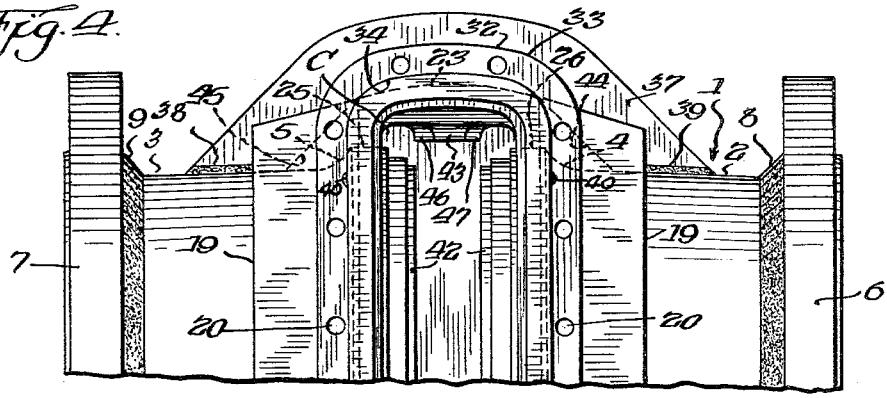
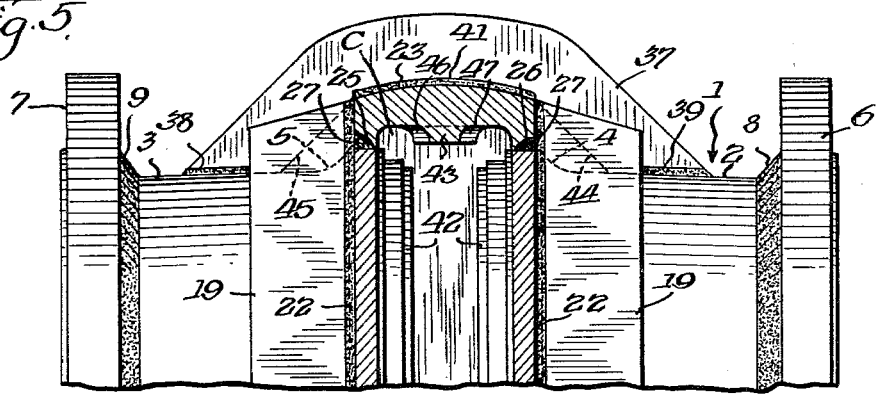
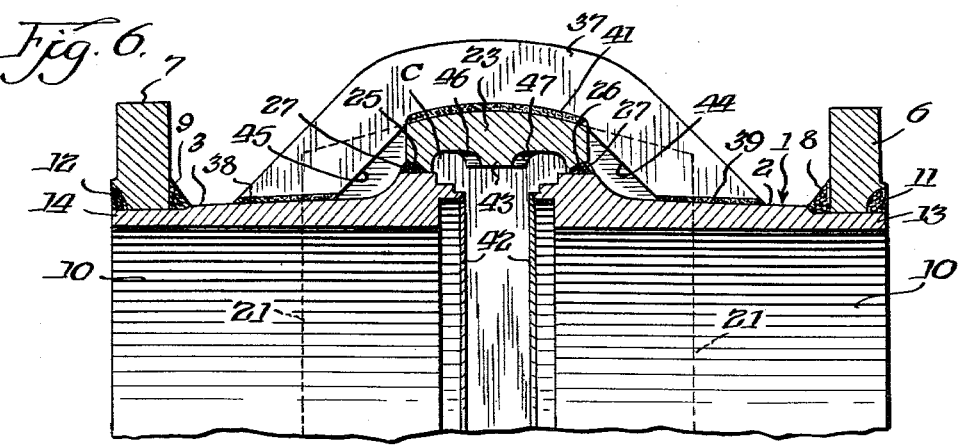
Inventors.
Joseph A. Englert,
Ernest W. Geipel, &
John P. Magos.
By Joseph O. Lange
Atty.

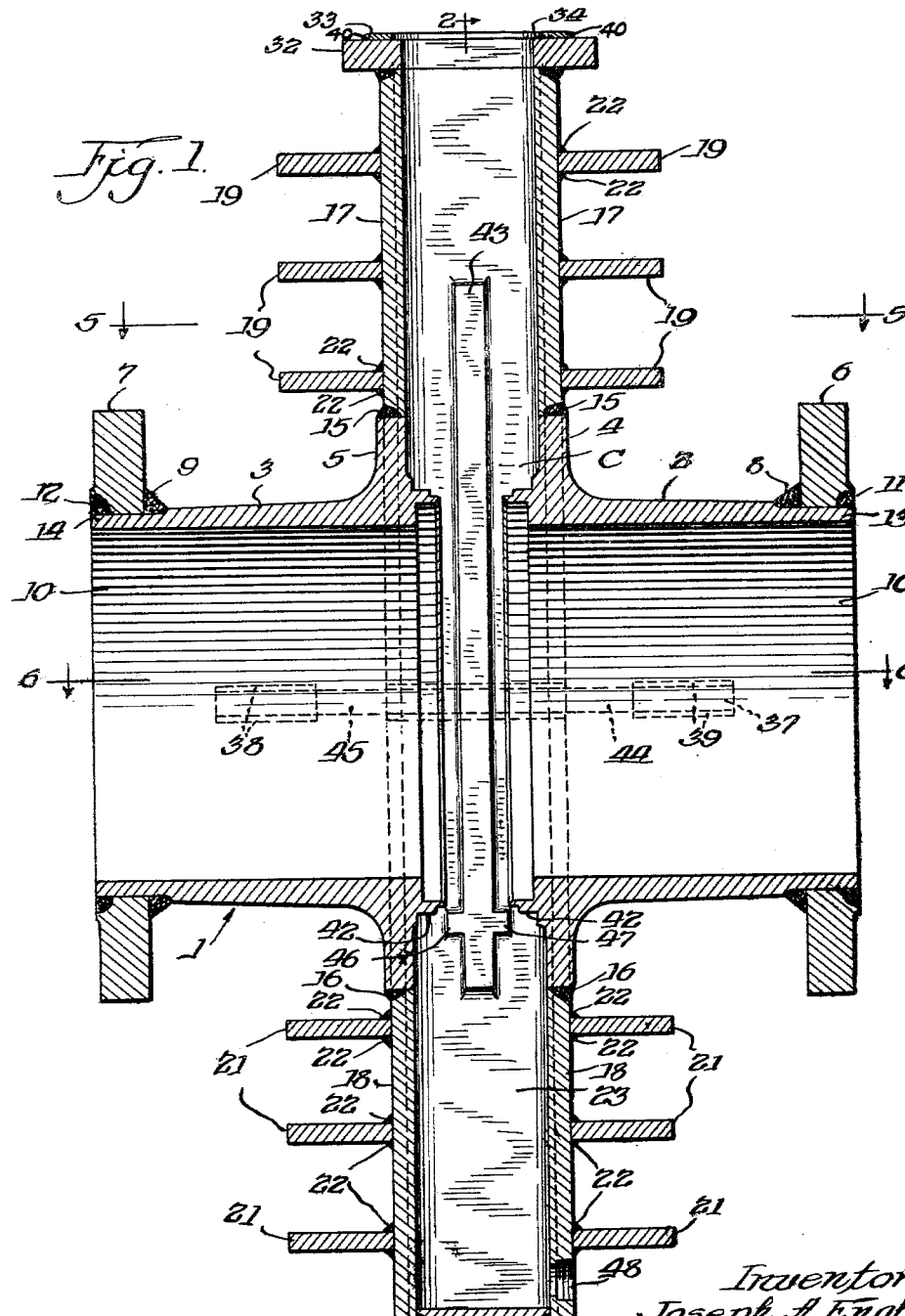

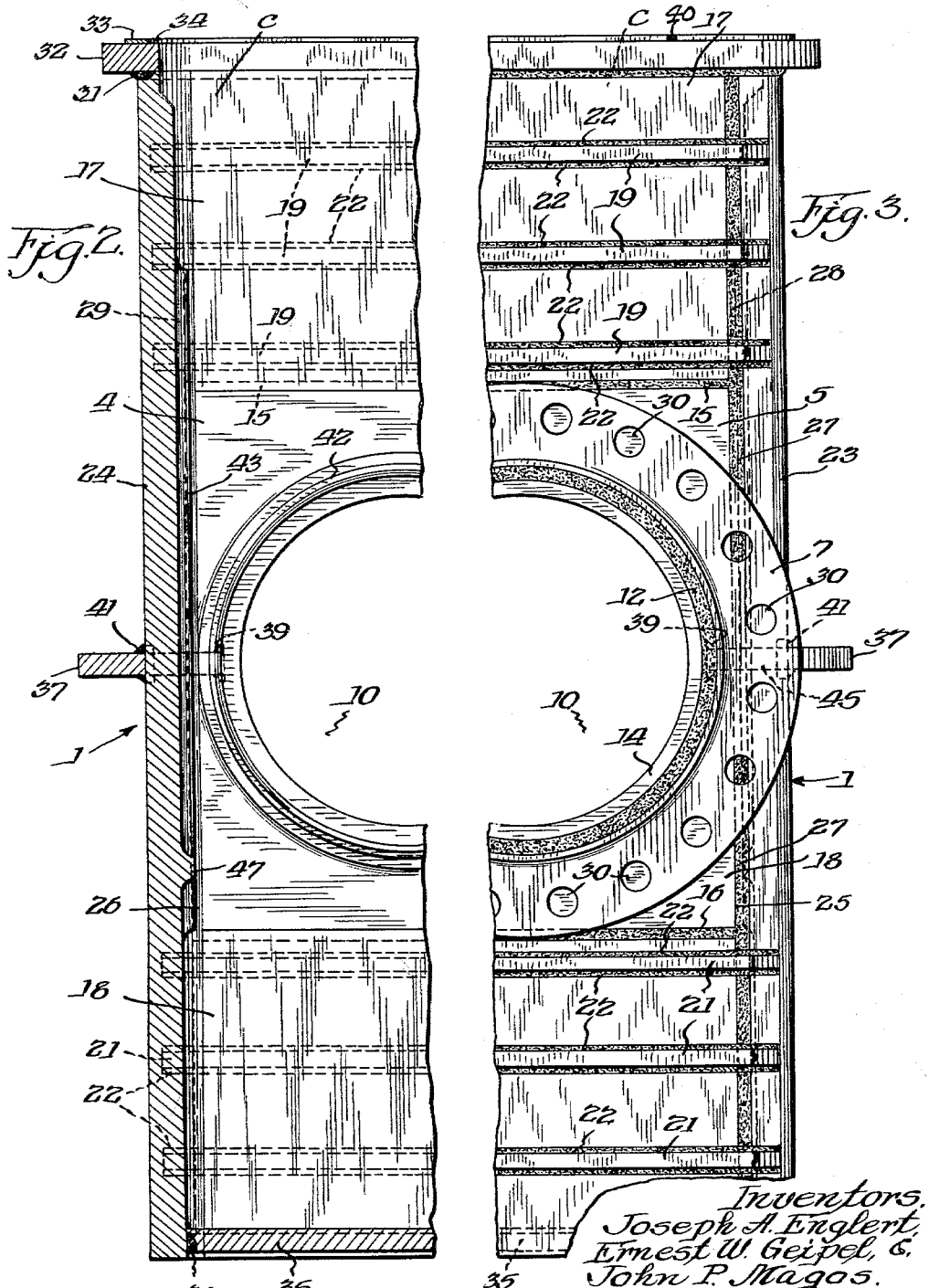

United States Patent Office 3,176,956
Patented Apr. 6, 1965

3,176,956
FABRICATED CONDUIT TYPE PIPE LINE VALVES
Joseph A. Englert and Ernest W. Geipel, Chicago, and John P. Magos, Wilmette, Ill., assignors to Crane Co., Chicago, Ill., a corporation of Illinois
Filed Dec. 1, 1961, Ser. No. 156,381
5 Claims. (Cl. 251—329)

This invention relates generally to the structure and method of making a fabricated gate valve. More particularly, the invention is concerned with the welding and assembling as the means for making the valve body or casing therefor. It should be understood that heretofore in connection with the manufacture of large valves, the cost of making castings has been expensive and yet for many types of valves employing castings throughout, this form of construction has been deemed to be a necessity, realizing that there is the need for imparting rigidity, strength and durability to the valve when considering the internal fluid pressures and additionally the piping strains encountered in the field.

It is therefore one of the more important objects of this invention to provide for a gate valve body and the fabrication thereof in which the requirements for strength, durability, and rigidity are conveniently met in that certain body parts which can be made in cast metal are thus made and in which such cast structures are supplemented by parts of substantially plate form. The latter parts are relatively easy to fabricate and are connected to the cast parts without substantial difficulty or expense on relatively high production schedules.

Another object is to provide for a fabricated valve body of relatively simple and economical manufacture, while effecting the desired strength and rigidity to the valve body or casing.

Another important object of the invention is to provide for a fabricated valve housing, in which the types of welds employed preferably lend themselves to high production straight-line automatic welding operations.

A further important object is to provide for a valve body which may easily be made from parts requiring only relatively simple patterns from which the side walls thereof are cast.

A further benefit lies in that the funnel-like ends thereof in which the valve port openings are provided are also suitably cast, the remainder of the valve body structure preferably being developed from plate steel with the connecting welds being linear, except for those welded portions provided for the connecting end flanges and the like for attachment to the pipe line.

Other objects and advantages will become more readily apparent upon proceeding with the following description read in light of the accompanying drawings, in which:

FIG. 1 is a sectional assembly view of a fabricated valve body embodying our invention;

FIG. 2 is substantially a half sectional view taken on the line 2—2 of FIG. 1;

FIG. 3 is substantially half of an end exterior elevation of the structure referred to in FIG. 2;

FIG. 4 is a plan exterior view of the sectional view shown in FIG. 1; and

FIGS. 5 and 6 are respective transverse sectional views taken on the lines 5—5 and 6—6 of FIG. 1.

Similar reference numerals refer to similar parts throughout the several views.

Referring now to FIG. 1, the fabricated gate valve body generally designated 1 having the chamber C consists of end disposed ported spools 2 and 3 with inner enlarged or flanged sections 4 and 5, the said sections being preferably of square or oblong configuration, as viewed from the ends and as shown more clearly in FIG. 3. Depending upon the size of the valve casing, the spools 2 and 3 may be of funnel-like form when viewed in section as shown in FIG. 1, or other suitable form depending upon the nature or extent of the service involved. The outer end portions of the spools as indicated at 6 and 7 are provided with the pipe line connecting flanges shown, drilled as at 30 (FIG. 3) for the usual bolting (not shown). Said flanges are attached by means of inner welds 8 and 9 by outer annular welds 11 and 12 to the respective shank portions 13 and 14.

In attached relation to the respective square flanges and preferably line weld secured thereto as at 15 and 16 the flat plate members 17 and 18 respectively are provided at upper and lower planes thereof, above and below the respective spool ports 10. It will now be clear that the ported spools 2 and 3 by reason of their weld attachment to the plates 17 and 18 along the square flanges 4 and 5 the members 17 and 18 thus provide the flat sides of the valve body 1. It is preferred that the ported spools 2 and 3 are produced as metal castings, because the castings in requiring a core for the ports 10 are molded and poured easily with the run (port) of the spool, the axis of the latter being normal or vertical to the cope and the drag of the mold.

The port spool is normally made as illustrated for a weld end construction so that when valves are required for use with flanged pipe line connecting ends, the outer end portions thereof as at 13 and 14 are conveniently machined to receive the slip-on flanges 6 and 7 which are then welded in place as shown.

A plurality of superposed and transversely extending ribs 19 preferably of flat plate form are arranged above or outwardly of the line welds 15 and also at 21 in planes below the straight line weld 16 are suitably attached as by means of the fillet welds 22 to add strength and stiffness or rigidity to the valve end plates 17 and 18.

For the purpose of imparting additional stiffness as well as strength to the valve body, the preferably cast and oppositely disposed side rails 23 and 24 are provided, being shown more clearly in FIGS. 2 and 3. These side rails preferably of a U-section or of hollow configuration in section as more clearly shown in FIGS. 5 and 6 are continuous and extend substantially for the full height of the valve body (FIGS. 2 and 3). They are weld-joined to the side disposed inner end surfaces 25 and 26 of the respective spools 2 and 3 by means of the straight line welds 27. The latter welds engage the side disposed surfaces 28 and 29 of the respective upper and lower casing end plates 17 and 18 as indicated. At the upper straight edge limits of the plate 17 and also at the top of the respective cast rails 23 and 24 a substantially continuous annular weld is applied at 31 for attachment of the bonnet flange 32 to the said plates and rails constituting the valve body assembly.

For the purpose of retaining a bonnet gasket, a suitable ring 33 is attached by any convenient method, say tack-weld attached as at 40, the gasket (not shown) being received within the annular recess 34 thus formed. It will be appreciated that the said gasket functions to provide the fluid-tight seal between the casing and valve bonnet (not shown) when the latter member is applied thereto and hereinafter further qualified. The flange 32 as indicated more clearly in FIG. 4 is preferably, but not necessarily, of narrow elongated configuration and connects such suitable valve bonnet as that shown for example on page 92 of Crane Co.'s No. 60 Catalog. The valve casing chamber C at its lower portion is defined by a plain closure plate 35 preferably of steel plate of suitable thickness and having a convenient means of attachment, such as the annularly extending line weld 36 designated. While the member 35 is shown as being received within the casing chamber C it will be appreciated that this attachment in the plates 18 may be made exteriorly of the latter members.

As shown perhaps more clearly in FIG. 6 and for purpose of strengthening and of stiffening the resulting fabricated vessel the end disposed port spool members are also connected with the rails 23 by means of the side disposed horizontally extending rib members 37, welded as at 38 and 39 to the respective port spools 3 and 2. Each of said ribs 37 at inner portions thereof is connected by means of the weld 41 to the respective cast side rails 23 and 24 as indicated, thereby firmly connecting the said rails with the respective port spool members 2 and 3 as shown, thus not only enhancing the durability of the casing in resisting internal fluid pressures and pipe line strains in service, but also beneficially contributing to the over-all performance of the valve under a variety of operating conditions.

To complete the valve body structure, at the inner annular portions of the respective spool members, suitable valve seats are provided as at 42. Said seats slidably engage the reciprocally movable valve gate or closure member (not shown). The said gate moves on the oppositely disposed guide ribs 43 provided the cast rails during the course of such reciprocal movement in opening and closing the valve. It will of course be appreciated that the guide 43 not only function as the guide for the closure member during its reciprocal movement as explained, but it will also be clear that substantial stiffness to the structure of the respective cast side rails and the over-all casing assembly is provided.

While only a bonnet connection at flange 32 has been indicated, it should be understood that so far as the bonnet and yoke are concerned, the bonnet flange is preferably of apertured metal plate. The yoke preferably should be interchangeable with valve yokes normally used on all cast conduit valves in the same pressure classes. It will of course be appreciated that while specific reference is made herein to a conduit valve, the method of fabricating the valve body also lends itself to the production of conventional gate valves by simply shortening the length of the plate members 18.

It will be further apparent that in order to avoid any interference and possible conflicting stresses with the welds at 27 joining the cast side rails to the respective spool members 2 and 3, the side disposed ribs 37 are provided with relieved or cut-away portions as indicated at 44 and 45 from which relieved portions the respective welds 39 and 38 extend at either end thereof to the outer limits of the ribs 37, thereby to bridge the transverse welds 27 connecting the rails 23 and 24 to the respective spools and plates. The extended portion on the guide 43 as indicated at 46 and 47 serve as stop portions for the closure member when the latter is in the open position.

As shown in FIG. 1, for the removal of any sedimentary deposits, a suitable drain opening 48 may be applied to the completed assembly, and provided either with a removal plug or conduit (both not shown) for such purpose.

While only a single embodiment has been shown and described, it will be understood that the method and construction disclosed lends itself readily to other forms of valve bodies and pressure vessels. Therefore, it is the desire that the invention should be limited only by the scope of the claims appended hereto.

We claim:
1. In a fabricated gate valve;
   a body having an inlet and an outlet and a central valve chamber therebetween with a valve gate therefor;
   the valve chamber being defined on its side portions by elongated rail members oppositely disposed;
   cast ported spools oppositely disposed communicating with said valve chamber;
   the front and rear portions of the valve chamber being defined in part by said cast ported spools, the latter members having transversely extending integrally cast inner flange portions of plate-like substantially polygonal configuration;
   oppositely disposed transverse plates both above and below the said inner flange portions of said spools and being of the same width as the inner flange portions of the said spools;
   pipe line connecting means attached to the outer end of said ported spools;
   said elongated side rail members respectively joined on edge portions thereof to the said plate-like flange portions of the spools and to each of the said transverse plates above and below the said plate-like portions of said spools;
   a base member joined to said plate-like members to close the lower limits of the valve chamber;
   and bonnet flange connecting means welded to upper edges respectively of said upper transverse plates and said side rail members.

2. The subject matter of claim 1, the said side rails having oppositely disposed inwardly projecting wall surfaces defining said valve chamber for guiding the said valve gate in its reciprocating movement.

3. The subject matter of claim 2, the said side rails having stop means for the said valve gate at a lower portion of the said guide means.

4. The subject matter of claim 1, including rib means on the valve horizontal axis connecting outer surface portions of the side rails with outer surface portions of said spools.

5. The subject matter of claim 4, including superposed rib means on the body connecting the side rails with said plates.

References Cited by the Examiner
UNITED STATES PATENTS

| | | | |
|---|---|---|---|
| 1,243,736 | 10/17 | Hibbard | 251—326 |
| 2,431,732 | 12/47 | Colbert | 29—157.1 XR |
| 2,851,051 | 9/58 | Englert et al. | 251—329 |
| 2,904,306 | 9/59 | Bryant | 251—329 |
| 3,013,770 | 12/61 | Anderson | 251—329 |

FOREIGN PATENTS 1,171,258  4/57  France.

MARTIN P. SCHWADRON, *Acting Primary Examiner.*
HYLAND BIZOT, EMIL PAUL, *Examiners.*